US 8,039,570 B2
Oct. 18, 2011

United States Patent
Irifune

(54) SOLVENT-FREE SILICONE COMPOSITION FOR RELEASE PAPER

(75) Inventor: Shinji Irifune, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 996 days.

(21) Appl. No.: 11/580,015

(22) Filed: Oct. 13, 2006

(65) Prior Publication Data

US 2007/0087207 A1    Apr. 19, 2007

(30) Foreign Application Priority Data

Oct. 14, 2005    (JP) .................................. 2005-299799

(51) Int. Cl.
*C08G 77/50*    (2006.01)
*C08G 77/10*    (2006.01)
*C08G 77/44*    (2006.01)
*C08L 83/04*    (2006.01)
*C08L 83/05*    (2006.01)
*C08L 83/07*    (2006.01)
*C09D 183/04*   (2006.01)

(52) U.S. Cl. ........ 528/19; 428/41.7; 428/41.8; 428/447; 528/31; 528/32; 528/33; 524/862; 525/474

(58) Field of Classification Search ............... 528/10–43; 428/447, 41.8, 41.7; 524/858–869; 525/474–479
See application file for complete search history.

(56) References Cited

U.S. PATENT DOCUMENTS

| | | | |
|---|---|---|---|
| 3,922,443 A | | 11/1975 | Brown et al. |
| 4,057,596 A | | 11/1977 | Takamizawa et al. |
| 4,071,644 A | | 1/1978 | Grenoble et al. |
| 5,100,976 A | * | 3/1992 | Hamada et al. ............... 525/477 |
| 5,292,586 A | * | 3/1994 | Lin et al. .................. 428/355 R |
| 5,308,887 A | * | 5/1994 | Ko et al. ........................ 522/148 |
| 5,319,040 A | * | 6/1994 | Wengrovius et al. .......... 525/478 |
| 5,373,078 A | * | 12/1994 | Juen et al. ........................ 528/15 |
| 5,468,828 A | | 11/1995 | Hurford et al. |
| 5,708,075 A | * | 1/1998 | Chung et al. ................... 524/765 |
| 2002/0061998 A1 | | 5/2002 | Cray et al. |
| 2003/0035965 A1 | * | 2/2003 | Irifune et al. .................. 428/447 |

FOREIGN PATENT DOCUMENTS

| | | |
|---|---|---|
| EP | 0 216 376 A1 | 4/1987 |
| EP | 0 780 454 A2 | 6/1997 |
| EP | 1 172 397 A2 | 1/2002 |
| EP | 1 557 451 A1 | 7/2005 |
| EP | 1 788 033 A2 | 5/2007 |
| JP | 49-47426 | 5/1974 |
| JP | 50-141591 | 11/1975 |
| JP | 52-39791 | 10/1977 |
| JP | 57-77395 A | 5/1982 |
| JP | 5-53183 B2 | 8/1993 |

OTHER PUBLICATIONS

Cypryk et al, Mechanism of the Acid-Catalyzed Si-O Bond Cleavage in Siloxanes and Siloxanols. A Theoretical Study; Organometallics, 2002, 21, pp. 2165-2175.*

* cited by examiner

*Primary Examiner* — Randy Gulakowski
*Assistant Examiner* — Rachel Kahn
(74) *Attorney, Agent, or Firm* — Birch, Stewart, Kolasch & Birch, LLP

(57) ABSTRACT

A solvent-free silicone composition for release paper, comprising a mixture prepared by
  i) subjecting the organopolysiloxane (I) which is composed of $R^1_3SiO_{1/2}$ units, $SiO_{4/2}$ units and $(HO)SiO_{3/2}$ units, and has an OH group content of from 0.02 to 0.1 mol/100 g, to a partial condensation reaction in an organic solvent in the presence of an alkaline catalyst and the organopolysiloxane (II) represented by the following formula (2), and
  ii) removing the organic solvent,
said mixture having an OH group content of less than 0.02 mol/100 g. The composition forms a tight-release layer stable with time.

12 Claims, No Drawings

SOLVENT-FREE SILICONE COMPOSITION FOR RELEASE PAPER

This application claims benefit of Japanese Patent application No. 2005-299799 filed on Oct. 14, 2005 the contents of which are hereby incorporated by reference.

FIELD OF THE INVENTION

The present invention relates to a solvent-free silicone composition for preparing release paper, particularly tight release paper.

DESCRIPTION OF THE PRIOR ART

Release paper is used for preventing adhesive materials from sticking or fixing to substrates such as paper and plastic. Various kinds of silicone compositions for preparing release paper are known and those comprising a solvent have been widely used because of good release property and wide applicability to various kinds of substrates. Recently, solvent-free type silicone composition is preferred from safety and hygienic viewpoints and various studies on solvent-free compositions have been made.

For example, Japanese Patent Application Laid-open No. 49-47426 discloses a coating composition mainly composed of an organopolysiloxane which can be applied to substrates such as paper and film without using a solvent.

Japanese Patent Application Laid-Open No. 50-141591 discloses a solvent-free silicone composition comprising a relatively low-molecular weight polysiloxane. It is described that the composition can form a coating layer having good releasing property and mechanical strength as high as the one attained by a higher-molecular weight polysiloxane.

Publication of Examined Japanese Patent Application No. 52-39791 discloses a solvent-free organopolysiloxane composition comprising an organopolysiloxane having vinyl groups, an organopolysiloxane having at least 3 SiH bonds per molecule, and a curing catalyst.

Japanese Patent Application Laid-Open No. 57-77395 discloses a solvent-free composition comprising a low-viscosity polysiloxane having a terminal vinyl group or silanol group, an organohydrogenpolysiloxane, and a curing catalyst.

Publication of Examined Japanese Patent Application No. 5-53183 discloses a polyorganopolysiloxane composition comprising (A) diorganopolysiloxane having at least two alkenyl groups bonded to silicon atoms per molecule, (B) liquid organohydrogenpolysiloxane having at least two SiH bonds, (C) a mixture of (a) a siloxane composed of $(CH_3)_3SiO_{0.5}$ units and $SiO_2$ units with (b) a siloxane composed of $(CCH_3)_2(CH=CH)SiO_{0.5}$ units and $SiO_2$ units, and (D) an addition reaction catalyst. It is described that use of Component (C) enables one to attain desired release force.

The siloxane (a) is called MQ resin. Depending on intended applications, various levels of release force are required and, for tight-release, the MQ resin containing alkenyl groups are commonly used. Here, the term, "tight-release force", means a force of 0.3N/50 mm or higher required to peel off a release paper from a pressure sensitive adhesive having weak adhesion force. Such an adhesive can be prepared from an acrylic emulsion BPW-3110H, ex TOYO Ink MFG. CO., LTD, which is used in the present Examples.

Generally, the more MQ resin is used, the tighter the release property is. However, the MQ resin having alkenyl groups is relatively expensive. Furthers the release force tends to decrease with time, although a desired initial release force can be attained with ease by adjusting an amount of the MQ resin.

SUMMARY OF THE INVENTION

An object of the present invention is to provide a composition which forms a release layer stable with time and has good cost performance. The present inventor has extensively studied to found that a silicone composition comprising a mixture of a reaction product which is prepared by a reaction between an OH group-containing MQ resin and a silicone oil having an alkenyl group in the presence of an alkaline catalyst can provide a tight-release layer which is stable with time.

Thus, the present invention is a solvent-free silicone composition for release paper, comprising a partial condensation reaction mixture of:

an organopolysiloxane (I) which is represented by the following average compositional formula (1) and has an OH group content of from 0.02 to 0.1 mol/100 g,

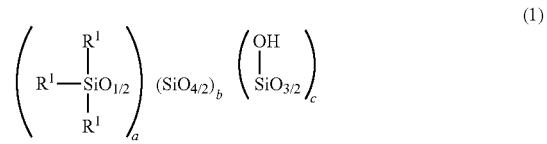

(1)

wherein $R^1$ may be the same with or different from each other and is a substituted or unsubstituted saturated monovalent $C_{1-10}$ hydrocarbon group, and a, b and c are positive numbers with $[a/(b+c)]$ ranging from 0.5 to 1.0, and an organopolysiloxane (II) represented by the following formula (2),

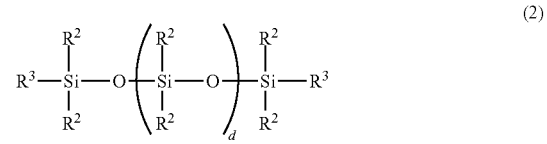

(2)

wherein $R^2$ may be the same with or different from each other and is a substituted or unsubstituted saturated monovalent $C_{1-10}$ hydrocarbon group, $R^3$ is an alkenyl group represented by the formula, $-(CH_2)_e-CH=CH_2$, wherein e is an integer of from 0 to 6, and d is such a number that the viscosity of the organopolysiloxane (II) ranges from 50 to 400 mPa·s, and wherein the partial condensation reaction mixture comprises a reaction product via a reaction between a hydroxyl group on the organopolysiloxane (I) and a cleaved siloxane bond of the organopolysiloxane (II), the partial condensation reaction mixture having an OH group content of less than 0.02 mol/100 g.

Preferably, the aforesaid composition for release paper comprises 5 to 60 parts by weight of the mixture as defined above, hereinafter referred to as the mixture (A), 95 to 40 parts by weight of (B) an organopolysiloxane represented by the following formula (3),

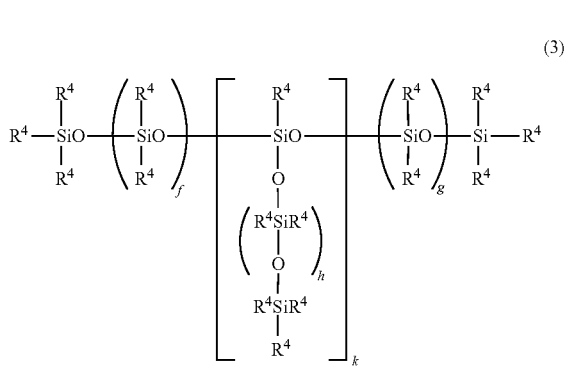

(3)

wherein $R^4$ is a monovalent hydrocarbon group, provided that at least two $R^{4'}$ are alkenyl groups represented by the formula, —$(CH_2)_e$—CH=$CH_2$, wherein e is an integer of from 0 to 6, k is a number ranging from 0 to 6, f, g and h are such numbers that the organopolysiloxane of the formula (3) has a viscosity of from 50 to 1000 mPa·s at 25° C., (C) a polyorganohydrogensiloxane having at least two SiH bonds per molecule in such an amount that a molar ratio of the SiH bonds to a total of the alkenyl groups of the mixture (A) and the organopolysiloxane (B) ranges from 1.0 to 4.0, and a catalytic amount of (D) a platinum group metal compound.

By comprising the mixture (A), the aforesaid present composition forms a tight-release layer which is stable with time.

PREFERRED EMBODIMENTS OF THE INVENTION

The mixture (A) is prepared by a reaction between an organopolysiloxane (I) and an organopolysiloxane (II) in the presence of an alkaline catalyst with heating. The organopolysiloxane (I) is represented by the following average compositional formula (1) and has an OH group content of from 0.02 to 0.1 mol/100 g,

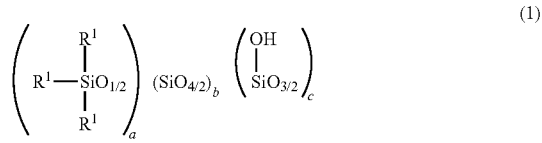

(1)

wherein $R^1$ may be the same with or different from each other and is a substituted or unsubstituted saturated monovalent $C_{1-10}$ hydrocarbon group, and a, b and c are positive numbers with [a/(b+c)] ranging from 0.5 to 1.0.

The organopolysiloxane (II) is represented by the following formula (2)

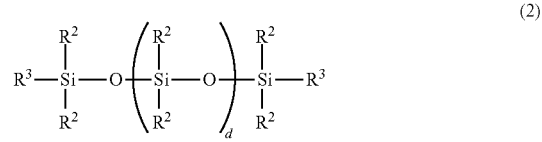

(2)

wherein $R^2$ may be the same with or different from each other and is a substituted or unsubstituted saturated monovalent $C_{1-10}$ hydrocarbon group, $R^3$ is an alkenyl group represented by the formula, —$(CH_2)_e$—CH=$CH_2$, wherein e is an integer of from 0 to 6, and d is such an number that a viscosity of the organopolysiloxane ranges from 50 to 400 mPa·s.

The reaction is performed until the reaction mixture has an OH group content less than 0.02 mol/100 g and, then, the organic solvent is removed.

$R^1$ may be the same with or different from each other and is a substituted or unsubstituted saturated monovalent $C_{1-10}$ hydrocarbon group. Examples of $R^1$ include alkyl groups such as methyl, ethyl, propyl and butyl groups; cycloalkyl groups such as a cyclohexyl group; aryl groups such as phenyl and tolyl groups; and partly or fully substituted groups thereof such as hydroxypropyl, cyanoethyl, 1-chloropropyl, and 3,3,3-trifluoropropyl groups, among which alkyl and aryl groups are preferred because of good curing and releasing properties.

The value, a/(b+c), ranges from 0.5 to 1.0, preferably from 0.6 to 0.9. The number c is such a positive number that an OH group content of the organopolysiloxane (I) ranges from 0.02 to 0.1 mol/100 g, preferably from 0.02 to 0.05 mol/100 g.

$R^2$ may be the same with or different from each other and is a substituted or unsubstituted saturated monovalent $C_{1-10}$ hydrocarbon group. Examples of $R^2$ include alkyl groups such as methyl, ethyl, propyl and butyl groups; cycloalkyl groups such as a cyclohexyl group; aryl groups such as phenyl and tolyl groups; and partly or fully substituted groups thereof such as hydroxypropyl, cyanoethyl, 1-chloropropyl, and 3,3,3-trifluoropropyl groups, among which alkyl and aryl groups are preferred because of good curing and releasing properties.

$R^3$ is an alkenyl group represented by the formula, —$(CH_2)_e$—CH=$CH_2$, wherein e is an integer of from 0 to 6, and d is such a number that a viscosity of the organopolysiloxane (II) ranges from 50 to 400 mPa·s, preferably from 50 to 200 mPa·s.

The mixture (A), hereinafter referred to as Component (A), is prepared by subjecting the aforesaid organopolysiloxane (I) and the organopolysiloxene (II) represented by the formula (2) to a partial condensation reaction in an organic solvent in the presence of an alkaline catalyst, and then removing the organic solvent. Temperature and time of the reaction is selected so as to make an OH group content of the reaction mixture less than 0.02 mol/100 g.

The organopolysiloxane (I) and the organopolysiloxane (II) are used in a weight ratio of I/II ranging from 20/80 to 80/20, preferably from 40/60 to 60/40.

Examples of the organic solvent include aromatic hydrocarbon solvents such as toluene and xylene; aliphatic hydrocarbon solvents such as hexane, octane, and isoparaffin; ether solvents such as diisopropyl ether, and 1,4-dioxane; and a mixture thereof, among which aromatic hydrocarbon solvents such as toluene and xylene, and aliphatic hydrocarbon solvents such as hexane, octane, and isoparaffin are preferred.

Examples of the alkaline catalyst include metal hydroxides such as sodium hydroxide, potassium hydroxide, and calcium hydroxide; metal alkoxides such as sodium methoxide and potassium buthoxide; organometal compounds such as butyl lithium; and a reaction product of dimethylpolysiloxane with alkaline metal hydroxide. The alkaline catalyst is used in an amount of from 0.001 to 1.0 part by weight per total 100 parts by weight of the organopolysiloxane (I) and the organopolysiloxane (II).

As described above, the time and temperature of the reaction is selected so as to make an OH content of Component (A) less than 0.02 mole/100 g. The reaction temperature can be a reflux temperature of the organic solvent used, preferably, ranging from 70 to 140° C., more preferably from 90 to 120° C. Reaction time may range from 0.5 to 12 hours, preferably from 3 to 12 hours.

During the reaction, OH group content is monitored with time by a quantitative method such as the Grignard method and the reaction is performed until the OH content of the reaction mixture gets less than 0.02 mol/100 g.

After the reaction, a neutralizing agent such as ethylene chlorohydrin, hydrochloric acid, and carbon dioxide gas is added dropwise in an amount of 2 to 100 molar equivalents per mole of the alkaline catalyst, which typically is 0.003 to 3.0 parts by weight per total 100 parts by weight of the organopolysiloxane (I) and the organopolysiloxane (II), and the mixture obtained is subjected to a neutralization reaction for 0.5 to 3 hours at a temperature of from 70 to 140° C.

The amount of remaining OH group in the mixture is less than 0.02 mol/100 g. A silicone composition comprising 0.02 mol/100 g or more of OH groups tends to form a cured coating on a substrate of which adhesion strength to the substrate is so low that the coating can be rubbed off with fingers.

Component (B) is the organopolysiloxane (B) represented by the following formula (3),

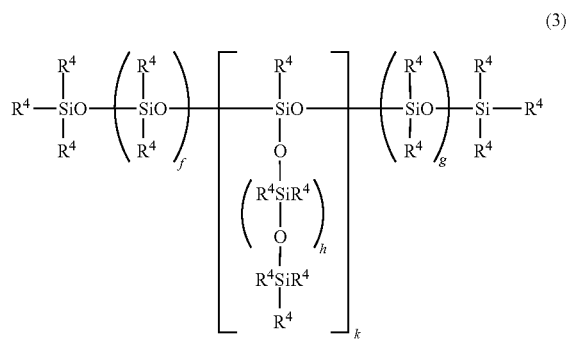

wherein $R^4$ is a monovalent hydrocarbon group having preferably 1 to 8 carbon atoms. At least two $R^{4'}$ are alkenyl groups represented by the formula $-(CH_2)_e-CH=CH_2$, wherein e is an integer of from 0 to 6. In the formula (3), k is a number ranging from 0 to 6, preferably from 0 to 4 because of easiness of preparation; f, g, h and k are such numbers that the organopolysiloxane has a viscosity of from 50 to 1000 mPa·s, preferably from 150 to 500 mPa·s at 25° C. Component (B) is used in an amount of from 40 to 95 parts by weight, preferably from 50 to 90 parts by weight, base on a total weight of the composition.

Component (C) is the polyorganohydrogensiloxane (C) having at least 2 hydrogen atoms each directly bonded to a silicon atom, preferably the polyorganohydrogensiloxane represented by the following average compositional formula (4).

$$R^5{}_m H_n SiO_{(4-m-n)/2} \quad (4)$$

wherein, $R^5$ is a $C_{1-10}$ hydrocarbon group. Examples of $R^5$ include alkyl groups such as methyl, ethyl, propyl and butyl group; cycloalkyl groups such as a cyclohexyl group; aryl groups such as phenyl and tolyl groups; and partly or fully substituted groups thereof such as 3-aminopropyl, 3,3,3-trifluoropropyl, 3-hydroxypropy groups, among which methyl and phenyl groups are preferred. In the formula, m and n are the numbers of from 0.5 to 1.5, with a sum of n and m ranging from 0 to 3.0. Preferably, m and n range from 0.8 to 1.0, with the sum of n and m ranging from 1.6 to 2.0.

Examples of Component (C) include the following polyorganohydrogensiloxanes.

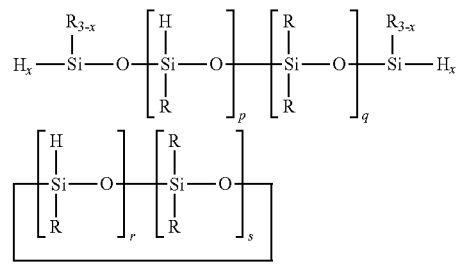

wherein R is a $C_{1-10}$ hydrocarbon group; x is 0 or 1; p and q are integers of 0 or larger, provided that p is 2 or larger when q is 0 and is such a number that a viscosity of the organohydrogensiloxane ranges from 1 to 5000 mPa·s; r is an integer of 2 or larger; s is an integer of 0 or larger, with a sum of r and s being 3 or larger, preferably ranging from 3 to 8.

The organohydrogenpolysiloxane has a viscosity at 25° C. of from 1 to 5000 mPa·s, preferably from 5 to 500 mPa·s. Component (C) may be a mixture of two or more of the organohydrogenpolysiloxane.

Component (C) is incorporated in the composition in such an amount that the hydrogen atoms directly bonded to silicon atoms ranges from 1.0 to 4.0 moles, preferably from 1.2 to 2.5 moles, per mole of total of the alkenyl groups of the organopolysiloxane (A) and the organopolysiloxane (B). If it is incorporated below the aforesaid lower limit, a cured film may not be sufficiently hard. If incorporated above the aforesaid upper limit, release strength of a cured film may change with time.

Component (D) is a platinum group metal compound used in a catalytic amount. Any known compounds used as an addition reaction catalyst can be used, for example, platinum, palladium and rhodium catalysts, among which platinum catalysts are preferred. Examples of the platinum catalysts include chloroplatinic acid, alcohol or aldehyde solutions of chloroplatinic acid, complexes of chloroplatinic acid with an olefin compound or vinylsiloxane. The platinum metal group catalyst is used in a catalytic amount, typically, of from 10 to 1000 ppm, based on a total weight of Components (A), (B) and (C), and preferably from 50 to 200 ppm from the economical viewpoint.

The present silicone compound can be prepared by mixing the respective amount of the aforesaid components (A), (B), (C) and (D). In addition to these components, an optional component can be incorporated in the composition, for example, (E) a retarder for the addition reaction. Examples of the retarder include organic nitrogen compound, organic phosphorous compounds, acetylenic compounds, oxime compounds, and organic chromium compounds. The retarder is incorporated in an amount not to adversely affect the present invention.

Examples of the retarder include acetylenic alcohols such as 3-methyl-1-butyne-3-ol, 3,5-dimethyl-1-hexyne-3-ol, and 3-methyl-1-pentyne-3-ol, and phenylbutynol; acetylenic compounds such as ethynylcyclohexanol, and 3-methyl-3-pentene-1-yene; reaction products of these acetylenic compounds with alkoxysilane, siloxane, or hydrogensilane; vinylsiloxane such as cyclic tetramethylviylsiloxane; and organic nitrogen compounds such as benzotriazole.

Other optional components can be added. For example, stabilizers, heat resistance improver, filler, pigments, leveling agents, adhesion aids, antistatic agents, antifoaming agents, and non-reactive organopolysiloxane.

The present composition can be applied to various substrates to manufacture release layer such as paper, sheets or labels. Examples of the substrates include paper such as glassine paper, craft paper, clay coated paper; laminated paper such as polyethylene-laminated paper, and polyethylene-laminated craft paper; plastic films or sheets such as polyester, polypropylene, polyethylene, polyvinylchloride, polytetrafluoroethylene, and polyimide films or sheets; and metal foils such as aluminum foil.

To apply the present composition, any known methods can be used, for example, role coating, gravure coating, Wire-bar coating, air knife coating, and dipping. An amount to be applied ranges from 0.01 to 100 g/m². The applied coating typically has a thickness of from 0.1 to 10 μm. The composition is applied to an entire surface or required parts of the substrate. The applied silicone composition is cured at a temperature of from 50 to 200° C. for 1 second to 5 minutes.

EXAMPLES

The present invention will be explained in detail below with reference to the Examples, but not limited thereto.
The following methods were used to evaluate compositions.
Curing Method of Silicone Compositions Immediately after preparation, a composition was applied to a polyethylene layer laminated on paper in an amount of 0.6 to 0.8 g/m², which is then heated at a temperature of 160° C. for 6 seconds in a hot-air dryer. The release paper thus obtained, hereinafter referred to as a silicone separator, was evaluated according to the following methods.
Adhesion to the Substrate A silicone coated surface of the silicone separator prepared by the aforesaid method was rubbed back and forth with a finger for several times and then observed whether there is any coating composition rubbed off the polyethylene-laminated paper. In Table 1, "Good" means that no coating was rubbed off, and "No Good" means there were some rubbed off.
Initial Release Force A silicone separator prepared by the aforesaid method was kept at 25° C. for 20 hours. On the silicone coated surface of the separator, an emulsion-type acrylic pressure sensitive adhesive, BPW-3110H, ex TOYO Ink MFG. CO., LTD, was applied and heated at 100° C. for 3 minutes. On the pressure sensitive adhesive layer thus prepared, high-quality paper was attached. The laminated body thus obtained was cut in a strip having 5 cm width. The strip thus obtained were kept at 25° C. for 20 hours and subjected to 180-degree peel test, in which the high-quality paper with the adhesive layer thereon was peeled at a pulling rate of 0.3 m/min by using a tensile testing machine and a required force (N) to peel off the paper was measured.
Release Force after Aging A force required to peel off the high-quality paper was measured in the same manner as above except that a silicone separator aged at 50° C. for 7 days was used in place of a silicone separator kept at 25° C. for 20 hours.
Percentage Change in Release Force Percentage change in release force was calculated according to the following equation:

Percentage change in release force(%)=[(Release force after aging−Initial release force)/Initial release force]×100

A smaller percentage change in release force means a smaller change in release force with time.
Subsequent Adhesion This test is to evaluate the effect of release surface made from the present silicone composition on an adhesive layer.

On the silicone coated surface of a silicone separator prepared by the aforesaid method, a polyester tape, Nitto 31B, ex NITTO DENKO Co., was placed. The silicone separator with the polyester tape placed thereon was kept at 70° C. for 20 hours with a load of 1976 Pa applied on the polyester tape. After cooling the separator to room temperature, the polyester tape was peeled off the separator and stuck again to a stainless steel plate. A force required to peel the polyester tape off the stainless steel plate, herein after referred to as Force (A), was measured in the same manner as in the measurement of the initial release force.

Control test was run in the same manner as described above except that a polytetrafluoroehtylene plate was used in place of the silicone separator. A force required to peel the polyester tape off the stainless steel plate, herein after referred to as Force (B), was measured according to the aforesaid method. From Force (A) and (B), subsequent adhesion in percentage was calculated according to the following equation:

Subsequent adhesion (%)=[Force (A)/Force (B)]×100

Example 1

Preparation of Component (A)

In a four-necked flask equipped with a stirrer, a thermometer, a condenser, and a dropping funnel, there were placed 250 parts by weight of 60% solution in toluene of the organopolysiloxane represented by the following average compositional formula (5) having an OH group content of 0.06 mol/100 g with a/(b+c) being 0.8

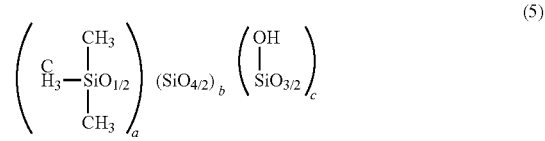

and 150 parts by weight of the organopolysiloxane represented by the formula (6) having a viscosity of 100 mPa·s.

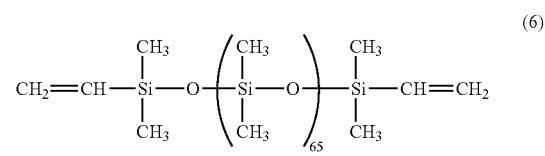

The mixture obtained was subjected to a reaction in the presence of 0.03 g of KOH as a catalyst while refluxing toluene at a temperature of from 120 to 125° C. for 5 hours under nitrogen gas flow. To the reaction mixture obtained, 1.0 g of ethylene chlorohydrin was added and subjected to neutralization reaction at a temperature of from 120 to 125° C. for 2 hours. Then, toluene was stripped at a reduced pressure. The organopolysiloxane mixture thus obtained, herein after referred to as the organopolysiloxane mixture A-1, had an OH group content of 0.015 mol/100 g.

Referential Example 1

The procedures in Example 1 were repeated except the reaction in the presence of 0.03 g of KOH was performed for 2 hours instead of 5 hours. The organopolysiloxane mixture thus obtained, herein after referred to as the organopolysiloxane mixture D-1, had an OH group content of 0.025 mol/100 g.

Referential Example 2

In a four-necked flask equipped with a stirrer, a thermometer, a condenser, and a dropping funnel, there were placed 250 parts by weight of 60% solution in toluene of the organopolysiloxane of the above formula (5) and 150 parts by weight of the organopolysiloxane of the above formula (6). The mixture obtained was stirred at room temperature for 1 hour and then toluene was stripped off. The organopolysiloxane mixture thus obtained, hereinafter referred to as the organopolysiloxane mixture D-2, had an OH group content of 0.03 mol/100 g.

Comparative Example 1

In a four-necked flask equipped with a stirrer, a thermometer, a condenser, and a dropping funnel, there were placed 250 parts by weight of 60% solution in toluene of the organopolysiloxane represented by the following average compositional formula (7) having an On group content of 0.005 mol/100 g with (p+q)/(r+s) being 0.8

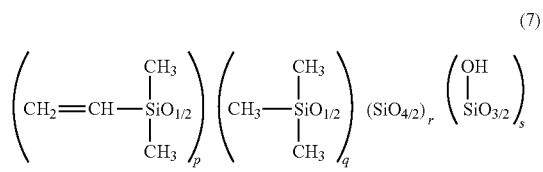

(7)

and 150 parts by weight of the organopolysiloxane of the aforesaid formula (6).

The mixture was stirred at room temperature for 1 hour and then toluene was stripped off. The organopolysiloxane mixture thus obtained, hereinafter referred to as the organopolysiloxane mixture D-3, had an OH group content of 0.003 mol/100 g.

Example 2

The organopolysiloxane mixture A-1 in an amount of 25 parts by weight, 75 parts by weight of the organopolysiloxane B-1 represented by the following formula having a viscosity at 25° C. of 400 mPa·s and a vinyl value of 0.019 mol/100 g,

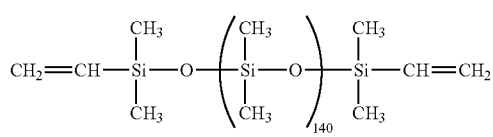

2.35 parts by weight of the methylhydrogenpolysiloxane C-1 represented by the following formula

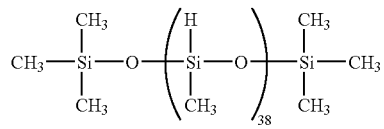

and 0.3 part by weight of ethynylcyclohexanol were mixed. To 100 parts by weight of the mixture obtained, 2 parts by weight of chloroplatinic acid complex with vinylsiloxane in an amount of 100 ppm as platinum metal was added and well mixed. The silicone composition thus obtained, hereinafter referred to as the silicone composition 1, was evaluated according to the aforesaid methods. Results are as shown in Table 1.

Example 3

The organopolysiloxane mixture A-1 in an amount of 50 parts by weight, 50 parts by weight of the organopolysiloxane B-1 represented by the following formula,

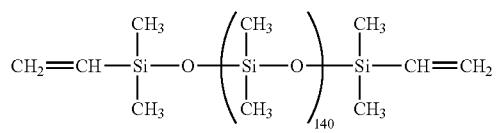

and the 2.30 parts by weight of the methylhydrogenpolysiloxane C-1 represented by the following formula

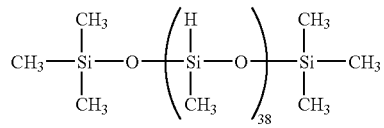

and 0.3 part by weight of ethynylcyclohexanol were mixed. To 100 parts by weight of the mixture obtained, 2 parts by weight of chloroplatinic acid complex with vinylsiloxane in an amount of 100 ppm as platinum metal was added and well mixed. The silicone composition thus obtained, hereinafter referred to as the silicone composition 2, was evaluated according to the aforesaid methods. Results are as shown in Table 1.

Referential Example 3

The silicone composition 3 was obtained in the same manner as in Example 2 except that 25 parts by weight of the organosiloxane mixture D-1 was used in place of the organosiloxane mixture A-1. The silicone composition 3 was evaluated according to the aforesaid methods. Results are as shown in Table 1.

Referential Example 4

The silicone composition 4 was obtained in the same manner as in Example 2 except that 50 parts by weight of the organosiloxane mixture D-1 was used in place of the organosiloxane mixture A-1. The silicone composition 4 was evaluated according to the aforesaid methods. Results are as shown in Table 1.

Referential Example 5

The silicone composition 5 was obtained in the same manner as in Example 2 except that 25 parts by weight of the organosiloxane mixture D-2 was used in place of the organosiloxane mixture A-1. The silicone composition 5 was evaluated according to the aforesaid methods. Results are as shown in Table 1.

Referential Example 6

The silicone composition 6 was obtained in the same manner as in Example 2 except that 50 parts by weight of the organosiloxane mixture D-2 was used in place of the organosiloxane mixture A-1. The silicone composition 6 was evaluated according to the aforesaid methods. Results are as shown in Table 1.

Comparative Example 2

The silicone composition 7 was obtained in the same manner as in Example 2 except that 25 parts by weight of the organosiloxane mixture D-3 was used in place of the organosiloxane mixture A-1. The silicone composition 7 was cured and evaluated according to the aforesaid methods. Results are as shown in Table 1.

Comparative Example 3

The silicone composition 8 was obtained in the same manner as in Example 2 except that 50 parts by weight of the organosiloxane mixture D-3 in place of the organosiloxane mixture A-1, and 5.06 parts by weight of the methylhydrogenpolysiloxane C-1 were used. The silicone composition 8 was cured and evaluated according to the aforesaid methods. Results are as shown in Table 1.

Comparative Example 4

The organopolysiloxane B-1 in an amount of 100 parts by weight, 2.35 parts by weight of the methylhydrogenpolysiloxane C-1, and 0.3 part by weight of ethynyl cyclohexanol were mixed thoroughly. To 100 parts by weight of the mixture, 2 parts by weight of chloroplatinic acid complex with vinylsiloxane was added to obtain the silicone composition 9. The silicone composition 9 was evaluated according to the aforesaid methods. Results are as shown in Table 1.

TABLE 1

| | Adhesion to the substrate | Subsequent adhesion | Initial release force (N) | Release force after aging (N) | Change in release force (%) |
|---|---|---|---|---|---|
| Example 2 | Good | 100 | 0.39 | 0.40 | 3 |
| Example 3 | Good | 99 | 0.52 | 0.55 | 6 |
| Referential Example 3 | No Good | 98 | 0.35 | 0.38 | 9 |
| Referential Example 4 | No Good | 97 | 0.47 | 0.51 | 9 |
| Referential Example 5 | No Good | 97 | 0.36 | 0.38 | 6 |
| Referential Example 6 | No Good | 96 | 0.56 | 0.60 | 7 |
| Comparative Example 2 | Good | 100 | 0.19 | 0.12 | −37 |
| Comparative Example 3 | Good | 100 | 0.34 | 0.19 | −44 |
| Comparative Example 4 | Good | 100 | 0.11 | 0.08 | −27 |

Examples 2 and 3, both comprising Component (A), showed lager release force than Comparative Example 4, indicating tight-release effect attained by Component (A). The tight-release force was stable with time. Referential Examples from 3 to 6 which comprised organopolysiloxane mixtures having OH content higher than 0.02 mol/100 g showed lower adhesion to the substrate than Examples 2 and 3. Comparative Examples 2 and 3 showed degradation of the release force with time.

The invention claimed is:
1. A method for preparing a solvent-free silicone composition, the method comprising steps of:
  i) reacting an organopolysiloxane (I) represented by the following average compositional formula (1) and has an OH group content of from 0.02 to 0.1 mol/100 g,

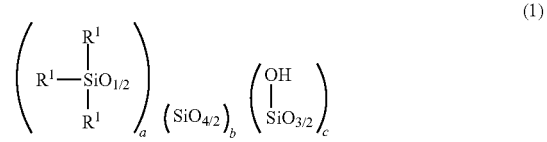

(1)

wherein $R^1$ may be the same with or different from each other and is a substituted or unsubstituted saturated monovalent $C_{1-10}$ hydrocarbon group, and a, b and c are positive numbers with [a/(b+c)] ranging from 0.5 to 1.0, and
an organopolysiloxane (II) represented by the following formula (2),

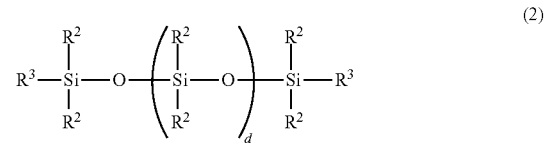

(2)

wherein $R^2$ may be the same with or different from each other and is a substituted or unsubstituted saturated monovalent $C_{1-10}$ hydrocarbon group, $R^3$ is an alkenyl group represented by the formula, $-(CH_2)_e-CH=CH_2$, wherein e is an integer of from 0 to 6, and d is such an number that a viscosity of the organopolysiloxane(II) ranges from 50 to 400 mPa·s, in a weight ratio of organopolysiloxane (I)/organopolysiloxane (II) ranging from 20/80 to 80/20 in an organic solvent in the presence of an alkaline catalyst at a temperature of from 70 to 140° C. for 0.5 to 12 hours,
  ii) removing the organic solvent to obtain a first component,
wherein the first component comprises a reaction product via a reaction between a hydroxyl group on the organopolysiloxane (I) and a cleaved siloxane bond of the organopolysiloxane (II) and has an OH group content of less than 0.02 mol/100 g, and iii) mixing the following (A)-(D) components, (A) 5 to 60 parts by weight of the obtained first component;

(B) 95 to 40 parts by weight of an organopolysiloxane represented by the following formula (3);

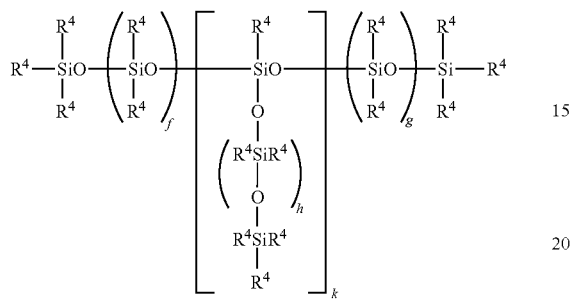

(3)

wherein $R^4$ is a monovalent hydrocarbon group, provided that at least two $R^4$s are alkenyl groups represented by the formula, —$(CH_2)_e$—CH=$CH_2$, wherein e is an integer of from 0 to 6, k is a number ranging from 0 to 6, f, g and h are such numbers that the organopolysiloxane of the formula (3) has a viscosity of from 50 to 1000 mPa·s at 25° C.;

(C) a polyorganohydrogensiloxane having at least two SiH bonds per molecule in such an amount that a molar ratio of the SiH bonds to a total of the alkenyl groups of the mixture (A) and the organopolysiloxane(B) ranges from 1.0 to 4.0; and (D) a catalytic amount of a platinum group metal compound.

2. The method according to claim 1, wherein the reaction between the organopolysiloxane (I) and the organopolysiloxane (II) is performed in the presence of 0.001 to 1.0 part by weight of the alkaline catalyst per total 100 parts by weight of the organopolysiloxane (I) and the organopolysiloxane (II), the alkaline catalyst is neutralized by adding dropwise a neutralization agent in an amount of from 2 to 100 molar equivalents per alkaline catalyst and heating at a temperature of from 70 to 140° C. for 0.5 to 3 hours.

3. A method for preparing a paper having a release layer, the method comprising steps of:

i) preparing the solvent-free silicone composition according to claim 1; and ii) applying the solvent-free silicone composition prepared in the aforesaid step i) on at least one surface of the paper.

4. A method for preparing a paper having a release layer, the method comprising steps of:

i) preparing the solvent-free silicone composition according to claim 2; and ii) applying the solvent-free silicone composition prepared in the aforesaid step i) on at least one surface of the paper.

5. The method for preparing a paper according to claim 3, wherein the paper having a release layer is a tape, sheet or label.

6. The method for preparing paper according to claim 4, wherein the paper having a release layer is a tape, sheet or label.

7. A solvent-free silicone composition comprising:

(A) 5 to 60 parts by weight of a composition, the composition being prepared by the method comprising steps of:

i) reacting an organopolysiloxane (I) represented by the following average compositional formula (1) and has an OH group content of from 0.02 to 0.1 mol/100 g,

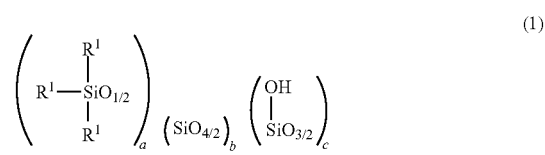

(1)

wherein $R^1$ may be the same with or different from each other and is a substituted or unsubstituted saturated monovalent $C_{1-10}$ hydrocarbon group, and a, b and c are positive numbers with [a/(b+c)] ranging from 0.5 to 1.0, and an organopolysiloxane (II) represented by the following formula (2),

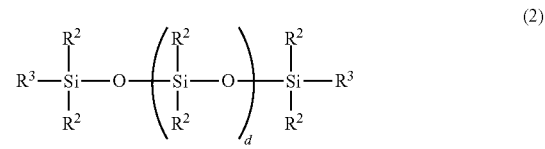

(2)

wherein $R^2$ may be the same with or different from each other and is a substituted or unsubstituted saturated monovalent $C_{1-10}$ hydrocarbon group, $R^3$ is an alkenyl group represented by the formula, —$(CH_2)_e$—CH=$CH_2$, wherein e is an integer of from 0 to 6, and d is such an number that a viscosity of the organopolysiloxane (II) ranges from 50 to 400 mPa·s, in a weight ratio of organopolysiloxane (I)/organopolysiloxane (II) ranging from 20/80 to 80/20 in an organic solvent in the presence of an alkaline catalyst at a temperature of from 70 to 140° C. for 0.5 to 12 hours, and (ii) removing the organic solvent to obtain the (A) component, wherein the (A) component comprises a reaction product via a reaction between a hydroxyl group on the organopolysiloxane (I) and a cleaved siloxane bond of the organopolysiloxane (II) and has an OH group content of less than 0.02 mol/100 g, (B) 95 to 40 parts by weight of an organopolysiloxane represented by the following formula (3),

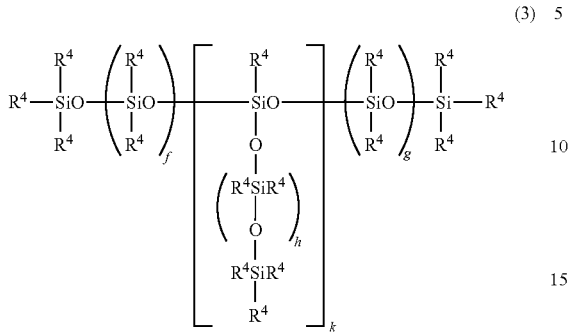

wherein $R^4$ is a monovalent hydrocarbon group, provided that at least two $R^4$s are alkenyl groups represented by the formula, $-(CH_2)_e-CH=CH_2$, wherein e is an integer of from 0 to 6, k is a number ranging from 0 to 6, f, g and h are such numbers that the organopolysiloxane of the formula (3) has a viscosity of from 50 to 1000 mPa·s at 25° C., (C) a polyorganohydrogensiloxane having at least two SiH bonds per molecule in such an amount that a molar ratio of the SiH bonds to a total of the alkenyl groups of the mixture (A) and the organopolysiloxane (B) ranges from 1.0 to 4.0; and (D) a catalytic amount of a platinum group metal compound.

8. The solvent-free silicone composition according to claim 7, wherein the reaction between the organopolysiloxane (I) and the organopolysiloxane (II) is performed in the presence of 0.001 to 1.0 part by weight of the alkaline catalyst per total 100 parts by weight of the organopolysiloxane (I) and the organopolysiloxane (II), the alkaline catalyst is neutralized by adding dropwise a neutralization agent in an amount of from 2 to 100 molar equivalents per alkaline catalyst and heating at a temperature of from 70 to 140° C. for 0.5 to 3 hours.

9. A paper having a release layer prepared by applying on at least one surface of the paper a solvent-free silicone composition comprising:

(A) 5 to 60 parts by weight of a composition, the composition being prepared by the method comprising steps of:
i) reacting an organopolysiloxane (I) represented by the following average compositional formula (1) and has an OH group content of from 0.02 to 0.1 mol/100 g,

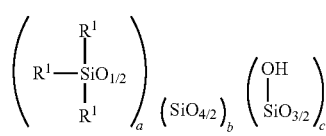

wherein $R^1$ may be the same with or different from each other and is a substituted or unsubstituted saturated monovalent $C_{1-10}$ hydrocarbon group, and a, b and c are positive numbers with [a/(b+c)] ranging from 0.5 to 1.0, and an organopolysiloxane (II) represented by the following formula (2),

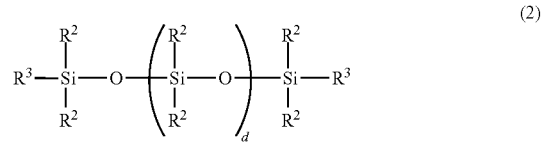

wherein $R^2$ may be the same with or different from each other and is a substituted or unsubstituted saturated monovalent $C_{1-10}$ hydrocarbon group, $R^3$ is an alkenyl group represented by the formula, $-(CH_2)_e-CH=CH_2$, wherein e is an integer of from 0 to 6, and d is such an number that a viscosity of the organopolysiloxane (II) ranges from 50 to 400 mPa·s, in a weight ratio of organopolysiloxane (I)/organopolysiloxane (II) ranging from 20/80 to 80/20 in an organic solvent in the presence of an alkaline catalyst at a temperature of from 70 to 140° C. for 0.5 to 12 hours, and ii) removing the organic solvent to obtain the (A) component wherein the (A) component comprises a reaction product via a reaction between a hydroxyl group on the organopolysiloxane (I) and a cleaved siloxane bond of the organopolysiloxane (II) and has an OH group content of less than 0.02 mol/100 g, (B) 95 to 40 parts by weight of an organopolysiloxane represented by the following formula (3),

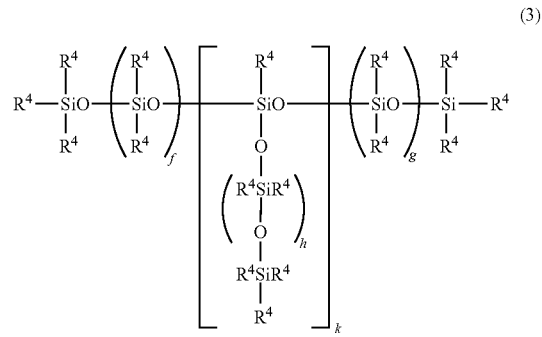

wherein $R^4$ is a monovalent hydrocarbon group, provided that at least two $R^4$s are alkenyl groups represented by the formula, $-(CH_2)_e-CH=CH_2$, wherein e is an integer of from 0 to 6, k is a number ranging from 0 to 6, f, g and h are such numbers that the organopolysiloxane of the formula (3) has a viscosity of from 50 to 1000 mPa·s at 25° C., (C) a polyorganohydrogensiloxane having at least two SiH bonds per molecule in such an amount that a molar ratio of the SiH bonds to a total of the alkenyl groups of the mixture (A) and the organopolysiloxane (B) ranges from 1.0 to 4.0; and (D) a catalytic amount of a platinum group metal compound.

10. The paper according to claim 9, wherein the reaction between the organopolysiloxane (I) and the organopolysiloxane (II) is performed in the presence of 0.001 to 1.0 part by weight of the alkaline catalyst per total 100 parts by weight of the organopolysiloxane (I) and the organopolysiloxane (II), the alkaline catalyst is neutralized by adding dropwise a neutralization agent in an amount of from 2 to 100 molar equivalents per alkaline catalyst and heating at a temperature of from 70 to 140° C. for 0.5 to 3 hours.

11. The paper according to claim 9, wherein the paper having a release layer is a tape, sheet or label.

12. The paper according to claim 10, wherein the paper having a release layer is a tape, sheet or label.

* * * * *